UNITED STATES PATENT OFFICE.

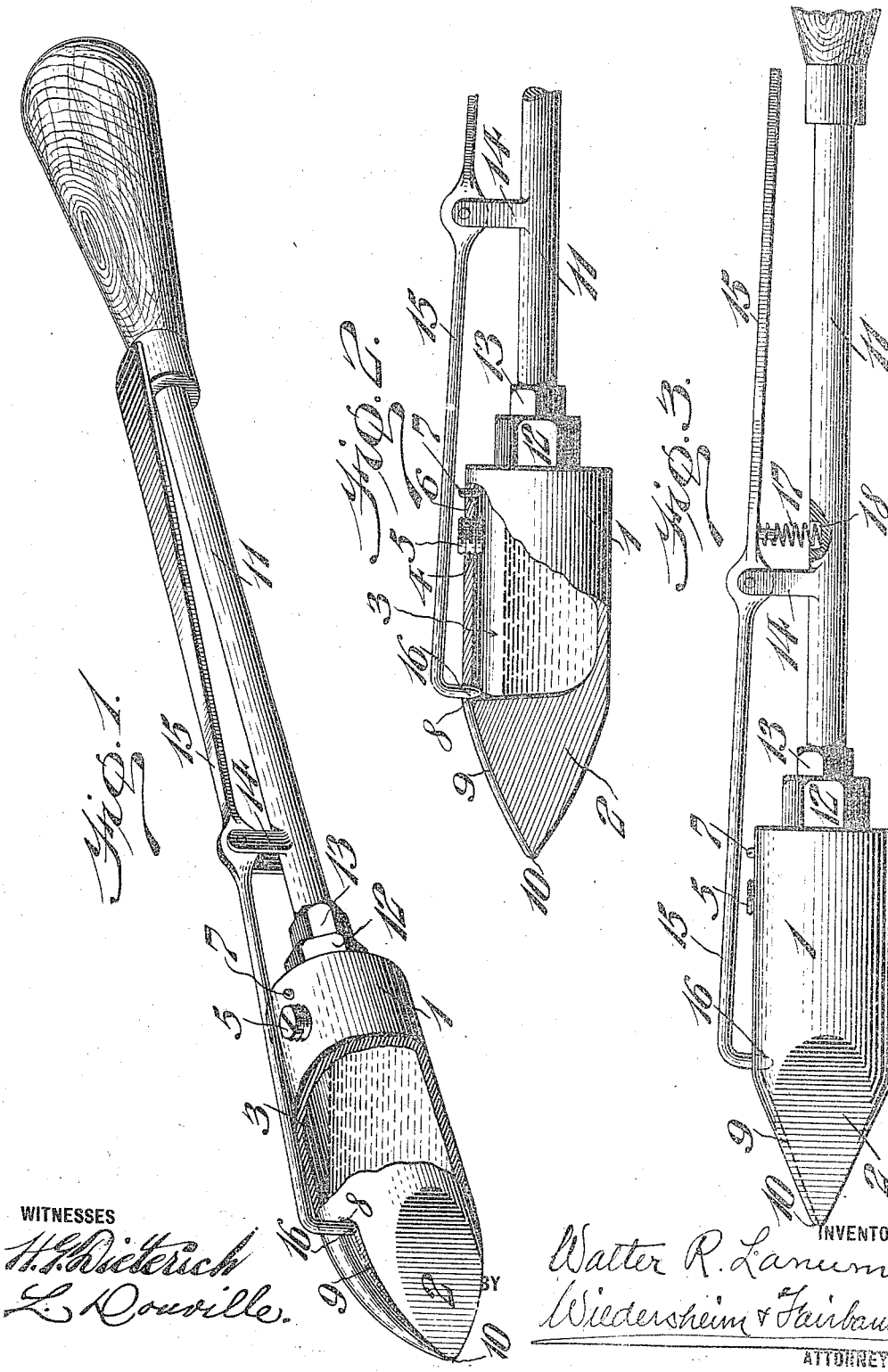

WALTER R. LANUM, OF PHILADELPHIA, PENNSYLVANIA.

SOLDERING-IRON.

959,233.  Specification of Letters Patent.  Patented May 24, 1910.

Application filed March 15, 1910. Serial No. 549,456.

*To all whom it may concern:*

Be it known that I, WALTER R. LANUM, a citizen of the United States, residing in the city and county of Philadelphia, State of Pennsylvania, have invented a new and useful Soldering-Iron, of which the following is a specification.

In many of the devices heretofore employed for soldering purposes there has been a large waste of the solder owing to the same dropping off from the point of the copper bolt which is ordinarily employed for this purpose and this is especially true in cases wherein it is necessary to employ the soldering iron in restricted places and around corners in which only one hand of the operator can be manipulated.

In order to overcome these defects in prior devices, I have devised a novel and simplified construction of a soldering iron which may be readily manipulated by one hand of the operator and wherein the soldering material is contained within the copper bolt in order that the solder may be heated by the same means as are employed to heat the point of the iron employed.

To the above ends my present invention consists of a novel construction of a soldering iron wherein means are provided for retaining the solder in a molten condition within the copper bolt and permitting the same to pass when desired to the point of the iron.

It further consists of novel means for controlling the passage of molten solder to the point of the iron.

It further consists of a novel construction of a soldering iron comprising a bolt of copper or other suitable material, such bolt being provided with a solder-containing chamber and means for permitting the filling of such chamber and also with an adjustable vent hole, said chamber communicating with the point of the iron by means of a controllable port.

It further consists of a novel construction of a soldering iron wherein the head or bolt is provided with a chamber having a groove leading therefrom to the point of the iron, the passage of molten solder to such groove being controlled by means of a lever which is normally maintained in closed position by the handle of the soldering iron or devices carried thereby.

It further consists of other novel features of construction, all as will be hereinafter fully set forth.

For the purpose of illustrating my invention, I have shown in the accompanying drawings the embodiments thereof which are at present preferred by me, since the same give satisfactory and reliable results in practice, although it is to be understood that the various instrumentalities of which my invention consists may be variously arranged and organized and that my invention is not limited to the precise arrangement and organization of these instrumentalities as herein set forth.

Figure 1 represents a perspective view partly broken away, of a soldering iron embodying my invention. Fig. 2 represents a side elevation partly in section of the same. Fig. 3 represents a side elevation of a soldering iron embodying my invention but showing different means for maintaining the lever controlling the passage of solder to the point of the iron in its normal position.

Similar numerals of reference indicate corresponding parts in the figures.

Referring to the drawings:—1 designates a bolt constructed of copper or other suitable material, said bolt having its forward end 2 of any desired contour, and for purposes of illustration I have shown the same as having the ordinary wedge shape, such as is familiar to those skilled in this art. The bolt 1 is provided with a solder retaining chamber 3 and in order that such chamber may be filled with solder I provide an aperture 4 which is closed by means of a suitable screw 5 or its equivalent.

6 designates a vent hole which if desired may be closed by means of a screw 7 or its equivalent. The chamber 3 is located in the rear end of the bolt 1 and its forward end near its upper portion is provided with a port 8 which communicates with a groove 9 leading to the point 10 of the soldering iron.

11 designates a rod having threaded or other engagement with the bolt 1 and secured thereto by means of a suitable nut 12, a lock nut 13 being also provided whereby the parts are maintained in their assembled position, it being understood that the rod 11 is provided with a grasping handle of any desired construction as will be readily understood by reference to Fig. 1. The rod 11 has secured thereto or integral therewith a boss or arm 14 to which is pivoted a lever 15, the forward end of which is deflected and suitably shaped as indicated at 16 to control the port 8. In the present instance I have preferred to show the end 16 as having a conical or tapered contour.

In the embodiment seen in Fig. 1, the rear end of the resilient lever 15 is adapted to normally engage with a portion of the grasping handle as will be readily understood by reference to Fig. 1, whereby the point 16 is normally seated in the port 8 in order to close said port and prevent passage of the solder to the groove 9. Any desired means may be employed for maintaining the port 8 normally closed, and in Fig. 3 I have shown another construction for doing this, wherein I provide a spring 17, one end of which in the present instance is seated in a recess 18 in the rod 11, the other end of said spring abutting against the lever 15 intermediate the arm 14 and the rear end of said lever, the effect of which is evident.

The operation of my novel construction of soldering iron may now be readily understood, and is as follows:—The closure 5 is first removed and the chamber 3 is filled with solder through the port 4, after which the closure 5 is replaced. The copper bolt is then heated whereupon the solder contained within the chamber 3 is reduced to a molten condition and the soldering iron is ready to be used.

When it is desired to employ the soldering iron as shown in Fig. 1, the lever 15 is pressed upon by the operator intermediate the pivotal point of the lever 15 and the grasping handle, whereupon the opposite end thereof, 16, will more or less open the port 8 as desired, thereby permitting the solder in its molten condition to pass from the chamber 3 through the port 8 and thence by means of the groove 9 to the point 10 of the iron. The screw 7 may be removed when desired and in many cases such part 7 may be entirely dispensed with.

It will be apparent that by the employment of my novel construction of soldering iron there can be no waste of the soldering material since only the requisite amount of solder will be permitted to pass to the point of the tool 10, with consequent economy of the soldering material. In the embodiment seen in Fig. 3, the end of the lever 15 would be depressed and the working of the soldering iron would be exactly the same as that seen in Figs. 1 and 2.

It will of course be understood that in practice, the closures 5 and 7 are preferably made substantially flush with the outer face of the bolt 1 and the lever 15 is placed in close proximity to the bolt 1, so that the soldering iron may be employed in places of very small area and since the soldering iron may be entirely actuated by a single hand of the operator, it will be apparent that the other hand of the operator will be free to mold the solder with any desired implement, as is sometimes necessary in such operations.

In my present invention the valve seat is formed exteriorly of the port 8 and has a conical contour communicating with the solder containing chamber 3 so that if the same becomes clogged at any time, it may be readily cleaned out without necessitating the taking apart of the device.

It is further to be noted that in my present invention the valve is located exteriorly of the bolt and only the inner end of the same comes into contact with the molten solder, so that the valve stem or lever 15 is free to operate under all conditions arising in practice.

I desire also to call attention to the fact that my present device may be employed under all conditions wherein the ordinary soldering iron may be employed, since my device is adapted to be heated by placing the same in the usual manner in the ordinary heating device employed in conjunction with the usual type of soldering irons and there is no liability of any of the mechanism becoming clogged up or becoming inoperative.

It will now be apparent that I have devised a novel and simplified construction of a soldering iron which embodies the features of advantage enumerated as desirable in the statement of invention and the foregoing description, and while I have, in the present instance, shown and described the preferred embodiments thereof, it will be apparent that they are susceptible of modifications in various particulars without departing from the spirit or scope of the invention.

Having thus described my invention, what I claim as new and desire to secure by Letters Patent, is:—

1. The combination in a soldering iron, of a bolt having a solder receiving chamber therein and a port leading from said chamber, the outer face of said port forming a valve seat, a valve located exteriorly of said bolt and co-acting with said seat, said bolt having a groove leading from said valve seat to the point of the bolt, a handle secured to said bolt, and yielding means for securing said valve with respect to said handle, whereby said valve is normally maintained in its closed position.

2. The combination in a soldering iron, of a bolt having a solder receiving chamber therein and provided with a port communicating with the atmosphere, the outer end of said port forming a valve seat, said bolt having a groove leading from said valve seat to the point of the bolt, said bolt having a filling aperture communicating with the solder receiving chamber, a closure for s h aperture, a handle carried by said bolt, and a lever movably carried by said handle and having its end deflected to form a valve member adapted to engage with said valve seat.

3. The combination in a soldering iron, of a bolt having a solder receiving chamber therein and a port communicating with the atmosphere, the outer end of said port forming a valve seat, said bolt having a groove leading from said valve seat to the point of the bolt, said bolt having a filling aperture and a vent aperture communicating with the solder receiving chamber, a closure for each of said apertures, a handle secured to said bolt, and a lever fulcrumed on said handle and having one end thereof deflected to form a valve co-acting with said seat, the other end of said lever engaging said handle to maintain said valve in its closed position, whereby when the pressure of the operator is exerted on said lever intermediate its fulcrum and the end engaging the handle, said valve will be disengaged from its seat.

WALTER R. LANUM.

Witnesses:
I. H. McCann,
H. S. Fairbanks.